April 2, 1957 R. HAGEN ET AL 2,787,023
MANUFACTURE OF BOTTLES AND THE LIKE FROM PLASTIC MATERIALS
Filed April 29, 1952

INVENTORS
Reinold Hagen, Norbert Hagen
BY

United States Patent Office 2,787,023
Patented Apr. 2, 1957

2,787,023

MANUFACTURE OF BOTTLES AND THE LIKE FROM PLASTIC MATERIALS

Reinold Hagen, Hangelar uber Siegburg, and Norbert Hagen, Siegburg, Germany

Application April 29, 1952, Serial No. 284,974

2 Claims. (Cl. 18—55)

This invention relates to the manufacture of bottles from organic plastic materials, especially thermoplastics, and more particularly to a process and an apparatus for the manufacture of bottles. The invention aims at the manufacture of blown plastic bottles, whereby the term "bottles" is understood to comprise ordinary bottles and other containers with a narrow neck or mouth.

A number of processes have heretofore been suggested to produce hollow articles from plastic materials, and numerous attempts have been made to provide suitable apparatus to carry out such processes.

According to one of the known suggestions, a mold is used, the cavity of which corresponds to the shape of the bottles to be produced. A combination blow pipe and extrusion tube is inserted into the mold cavity, and the end of the tube is brought to a position adjacent to the bottom of the mold. As plastic material is extruded, it spreads transversely, due to the close proximity of the bottom of the mold. The tube is now slightly raised, allowing the plastic to form a small bag. Then the tube is progressively withdrawn from the bottom of the mold. Plastic material and compressed air or any other suitable fluid are forced out in the same direction, the distending agent expanding the bag-shaped plastic against the wall of the mold to form a bottle.

Some known methods are concerned with the closing of the open-ended preliminarily extruded body. It is suggested that the preliminarily extruded body be closed adjacent to the orifice of the extrusion nozzle, whereupon further material is extruded to form and expand the closed-ended hollow body. Some suggestions deal with the shearing off a portion at the end of the extruded open-ended body.

In accordance with one known suggestion, a stationary extrusion nozzle is used to form a bag-shaped embryo bottle. The bag is introduced into a mold and is expanded to the desired shape by supplying fluid pressure to the interior of the bag.

The foregoing as well as other known suggestions provide that the plastic material and the fluid presure are supplied in the same direction, which arrangement requires complicated extrusion nozzles and fluid pressure supply means. Further, the known methods and apparatus provide that a baglike embryo article is first formed which is then expanded to the shape of the mold, the embryo article being a hollow body closed at its leading end. The end-forming means used are also complicated.

The primary object of our invention is to generally improve the manufacture of bottles and bottlelike vessels from organic plastic materials, more particularly to simplify, cheapen and speed up such manufacture.

To the accomplishment of the foregoing main object and other more detailed objects which will hereinafter appear, our invention consists in a method and an apparatus for the manufacture of bottles and the like from organic plastic materials, as are hereinafter more particularly described in the specification and sought to be defined in the claims.

The specification is accompanied by a drawing in which.

Figure 1:
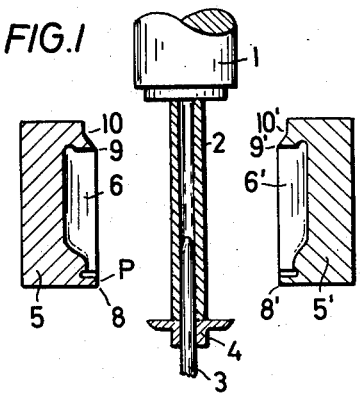
Fig. 1 is a partially sectioned elevation of an apparatus embodying features of our invention, with the two sections of single cavity die in open position, illustrating a certain stage in the manufacture of a bottle.

Referring to the drawing, and more particularly to Fig. 1, thermoplastic material is extruded in form of a hose 2 from an annular extrusion nozzle 1. No details of the extruding mechanism are shown since this mechanism may be of a conventional design. The hose 2 is extruded over a blow pipe 3, which is mounted in a support 4, to supply compressed air or any other fluid pressure. Identical sections 5 and 5' of a pinching die are shown in open position. Both die sections are relatively movable and meet in the parting plane P. The section 5 is provided with a cavity 6, and the section 5' with a cavity 6'. The cavities 6 and 6' mate in the parting plane P to form a composite cavity or the completed cavity for the bottle to be produced. The die halves are also provided with pinching edges 8, 9 and 8', 9', respectively, and with a cutout 10 and 10', respectively. The pipe 3, in addition to acting as a blow pipe, forms and serves as a core to form the neck of the bottle.

Figure 2:
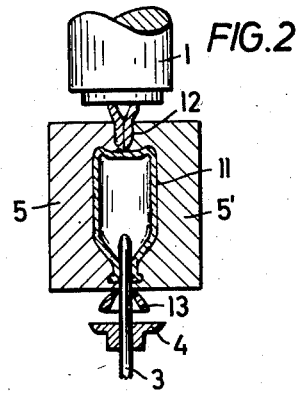
Fig. 2 shows the die sections of Fig. 1 in closed condition, illustrating a subsequent stage in the formation of the same bottle.

In Fig. 2, the same die is shown in closed position, ready to be opened again. A bottle 11 is shown to have been completed. End portions 12 and 13 of the hose 2 have been pinched off when the die sections have been closed, the portion 12 being partly received in the composite cutout 10, 10'.

According to one embodiment of our invention, we extrude a hose of an external diameter which is smaller than the diameter of the main body of the die cavity or of the bottle to be produced. The narrow hose has then to be expanded to the full size of the bottle.

Figure 3:
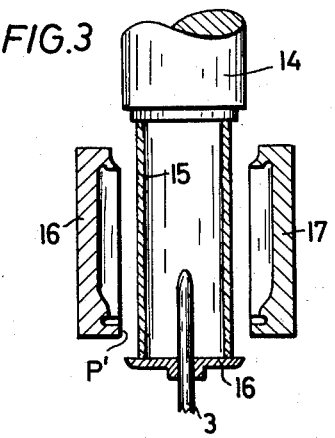
Fig. 3 is a view similar to that of Fig. 1 but showing a modified apparatus.
Figure 4:
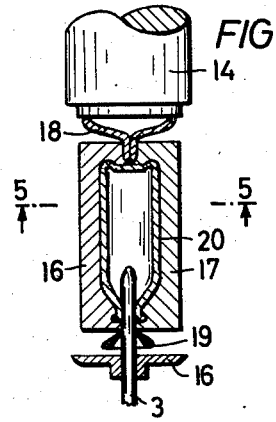
Fig. 4 is a view similar to that of Fig. 2.

In Figs. 3 and 4, there is an extrusion nozzle 14 with an annular orifice for a relatively wide hose 15. As in Figs. 1 and 2, the hose 15 is extruded until it strikes the support 16 of the blow pipe 3. The external diameter of the hose 15 is greater than the diameter of the cavity of the die formed by the halves 16 and 17. Pinched off portions of the hose are designated 18 and 19. The bottle 20 is again shown as it appears prior to the opening of the die.

Figure 5:
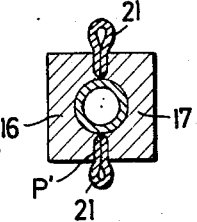
Fig. 5 is a horizontal section taken in the plane of the line 5—5 of Fig. 4.

In Fig. 5, pinched off portions 21 of the hose 15 are shown. The portions 21 are pinched off along the parting line P₁ of the die.

According to our method, bottles and similar vessels are produced in a continuous operation from segments of a plastic open-ended hose of generally uniform diameter and wall thickness. The hose is obtained by extrusion from a suitable extrusion nozzle and, while still in moldable condition, is introduced into an open pinching die the cavity of which corresponds to the shape of the article to be produced.

We provide a blow pipe which, in accordance with important features of our invention, points to the extrusion nozzle and forms a part of the pinching die. The blow pipe is arranged so that the extruded hose moves coaxially with, and towards, the blow pipe. The orifice of the blow pipe is directed towards the extrusion nozzle. The free open end of the hose surrounds the blow pipe. The extrusion is continued until the free hose end has moved beyond the space between the open die sections and below the die sections. The die sections, when closed, meet in a vertical plane. From Figs. 2 and 4 it will be seen that the blow pipe forms a core arranged in the plane of the parting line of the die to form the neck of the bottle shown. From the drawing it will also be seen that the hose is extruded to encircle the blow pipe. The free end of the hose is shown to be beyond the closed die, the extrusion nozzle and the die being arranged relative to each other so that the other end, too, of the hose is outside the die when closed. It will be clear that the blow pipe need not be arranged centrally and that asymmetrical bottles may be produced as well.

In blowing the bottles of Figs. 2 and 4, after the die has been closed, the fluid pressure is supplied in a direction opposite to the extrusion direction.

The apparatus is preferably arranged so that the bottle is formed with its neck down.

During the closing of the die, the two sections pinch off surplus material of the hose at the bottom end and neck end of the die. The open end of the hose at the bottom end will simultaneously be closed, the plastic material being welded together in this point. It can be seen that the portions of the die sections below the neck-forming portions will close tightly around the blow pipe. During the closing of the die or soon afterwards, air or any other gaseous pressure medium is admitted through the blow pipe to the pinched off segment of the hose, the open end of the hose being closed by the blow pipe. The plastic hose, depending on its dimensions expands to the wall of the mold cavity and assumes the shape of the die, or is formed into the desired shape as shown in Fig. 4. Air trapped between the hose and the die wall is permitted to escape through channels provided in suitable locations.

Whether the pressure medium for shaping the bottle is admitted to the inside of the hose segment during the closing of the die or only after the die has been completely closed will depend on several factors, such as the wall thickness of the hose, the speed of the closing motion, gaseous pressure available, the relation of the outer diameter of the hose to the internal diameter of the die cavity, etc. The most favorable timing has to be determined from case to case and will also depend on the operating temperature and on the viscosity of the thermoplastic synthetic material.

The manufacture of bottles or the like according to our method is not limited to the formation of a bottle by greater or lesser expansion of the hose diameter to the diameter of the bottle, which involves a reduction of the wall thickness of the hose to that of the bottle, at least within the area of the main body of the bottle, that is, from the region on where the neck joins the shoulder of the bottle.

It is also possible to start with a hose, the outer diameter of which is greater than the outer diameter of the bottle to be produced. In this case, after the hose has been lowered over the blow pipe, excess material, on closing of the die, is pinched off along the parting line of the die, while again during the closing of the die or afterwards air or another pressure medium is introduced through the blow pipe. In some cases, this method will have the advantage over the first described one of yielding bottles of uniform wall thickness. It will avoid non-uniform walls which otherwise may occur when working according to the first described method and when the material expanded is not entirely homogeneous or if it is not uniformly heated.

Any organic plastic material that is suitable for the purpose of our process and apparatus is to be considered within the purview of this invention. While our invention contemplates primarily the use of thermoplastics, such as cellulose acetates, acrylic resins, vinyl ester resins, styrene resins, etc., heat-setting plastic types, rubber compounds and other materials which may be rendered suitable may be used as well. The materials are used without liquid solvents or with solvents if their presence is required.

It is believed that the process of our invention, as well as the apparatus for practicing the invention, and the many advantages thereof will be understood from the foregoing detailed description, and it will be obvious that while we have shown and described the process and apparatus in a number of forms only, many changes may be made in the individual method steps and in the parts of the apparatus and in their arrangement without departing from the spirit of the invention defined in the following claims.

We claim:

1. Process for the manufacture of bottles from organic plastic materials, which includes forming a vertically suspended open ended tube by extruding such material from an extrusion nozzle into the space between open sections of a die, the tube having an external diameter greater than the external diameter of the bottle to be produced, directing the open end of the tube to slip over a blow pipe having its orifice within said space between the open die sections, continuing the extrusion to bring the open tube end beyond that space and below the sectional die, closing the die to pinch off the segment of the tube within the die, admitting a gaseous pressure medium to the pinched off tube segment through the blow pipe, and forming the bottle to be shaped in the die.

2. In the process according to claim 1, said closing of the die being done to pinch off, in addition to said tube segment, excess material along the parting line of the die sections, and reducing the tube, after said admission of a gaseous pressure, to the shape of the die.

References Cited in the file of this patent
UNITED STATES PATENTS

| | | |
|---|---|---|
| Re. 23,564 | Hobson | Oct. 14, 1952 |
| 2,288,454 | Hobson | June 30, 1942 |